United States Patent
Ogawa (10) Patent No.: US 9,900,456 B2
(45) Date of Patent: Feb. 20, 2018

(54) HUMAN BODY DETECTION DEVICE AND IMAGE FORMING APPARATUS

(71) Applicant: Seiya Ogawa, Tokyo (JP)

(72) Inventor: Seiya Ogawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/040,229

(22) Filed: Feb. 10, 2016

(65) Prior Publication Data

US 2016/0277617 A1    Sep. 22, 2016

(30) Foreign Application Priority Data

Mar. 18, 2015    (JP) .................................. 2015-054963

(51) Int. Cl.
*G06F 3/12*    (2006.01)
*H04N 1/00*    (2006.01)

(52) U.S. Cl.
CPC ..... *H04N 1/00891* (2013.01); *H04N 1/00204* (2013.01); *H04N 1/00896* (2013.01); *H04N 2201/0094* (2013.01); *H04N 2201/33307* (2013.01)

(58) Field of Classification Search
None
See application file for complete search history.

(56) References Cited

U.S. PATENT DOCUMENTS

| | | | | |
|---|---|---|---|---|
| 5,866,887 A * | 2/1999 | Hashimoto | ........ | G06K 9/00778 235/98 C |
| 9,280,707 B2 * | 3/2016 | Ishihara | ........ | H04N 1/00 |
| 2010/0150600 A1 * | 6/2010 | Oyoshi | ........ | G03G 15/5004 399/88 |
| 2013/0342382 A1 * | 12/2013 | Maeno | ........ | G01S 7/2927 342/93 |
| 2014/0092416 A1 * | 4/2014 | Ogata | ........ | G01S 17/08 358/1.14 |
| 2014/0160505 A1 * | 6/2014 | Tachikawa | ........ | H04N 1/00891 358/1.13 |
| 2015/0103365 A1 * | 4/2015 | Baba | ........ | H04N 1/00323 358/1.13 |
| 2016/0277620 A1 * | 9/2016 | Miyata | ........ | H04N 1/00896 |

FOREIGN PATENT DOCUMENTS

| | | |
|---|---|---|
| JP | 10-222023 | 8/1998 |
| JP | 2012-215402 | 11/2012 |

\* cited by examiner

*Primary Examiner* — Dung Tran
(74) *Attorney, Agent, or Firm* — Oblon, McClelland, Maier & Neustadt, L.L.P.

(57) ABSTRACT

A human body detection device detects whether a human body is present within a predetermined distance from an apparatus equipped with the human body detection device. The device includes a sensor, a threshold processing unit, and a sensor control unit. The sensor is configured to sense infrared to sequentially output a plurality of detection values. The threshold processing unit is configured to perform averaging and weighted averaging on the detection values to obtain a weighted average value of the detection values, and set a threshold based on the weighted average value of the detection values. The sensor control unit is configured to determine that the human body is present within the predetermined distance from the apparatus when a detection value output from the sensor exceeds the set threshold.

19 Claims, 6 Drawing Sheets

HUMAN BODY DETECTION DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2015-054963, filed on Mar. 18, 2015, in the Japan Patent Office, the entire disclosure of which is hereby incorporated by reference herein.

BACKGROUND

Technical Field

The present disclosure relates to a human body detection device and an image forming apparatus.

Description of the Related Art

Image forming apparatuses such as multifunction peripherals having multiple functions such as a copier function, a printer function, or a scanner function are known. Some multifunction peripherals include a human body detection device having a sensor that that detects a human body. Such multifunction peripheral including the human body detection device transitions from an energy saving mode when a user stands in front of the multifunction peripheral. Thus, the waiting time for a user is shortened. The human body detection device of the image forming apparatus detects the human body by the sensor that senses infrared.

SUMMARY

A human body detection device detects whether a human body is present within a predetermined distance from an apparatus equipped with the human body detection device. The device includes a sensor, a threshold processing unit, and a sensor control unit. The sensor is configured to sense infrared to sequentially output a plurality of detection values. The threshold processing unit is configured to perform averaging and weighted averaging on the detection values to obtain a weighted average value of the detection values, and set a threshold based on the weighted average value of the detection values. The sensor control unit is configured to determine that the human body is present within the predetermined distance from the apparatus when a detection value output from the sensor exceeds the set threshold.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying", refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, explanation will be made of a human body detection device and an image forming apparatus according to an exemplary embodiment of the present invention.

The human body detection device according to this exemplary embodiment performs section averaging processing on detection values that are output from a sensor in unit of short time period, and further performs weighted averaging processing on the result of the section averaging processing to acquire a drift amount of an output waveform relative to a designed base value. Based on the acquired drift amount, the human body detection device changes a threshold that is used for detecting presence of human body. Such configuration suppresses an influence of the drift on the detection of the human body, while reducing load on a memory or a central processing unit (CPU).

Figure 1:
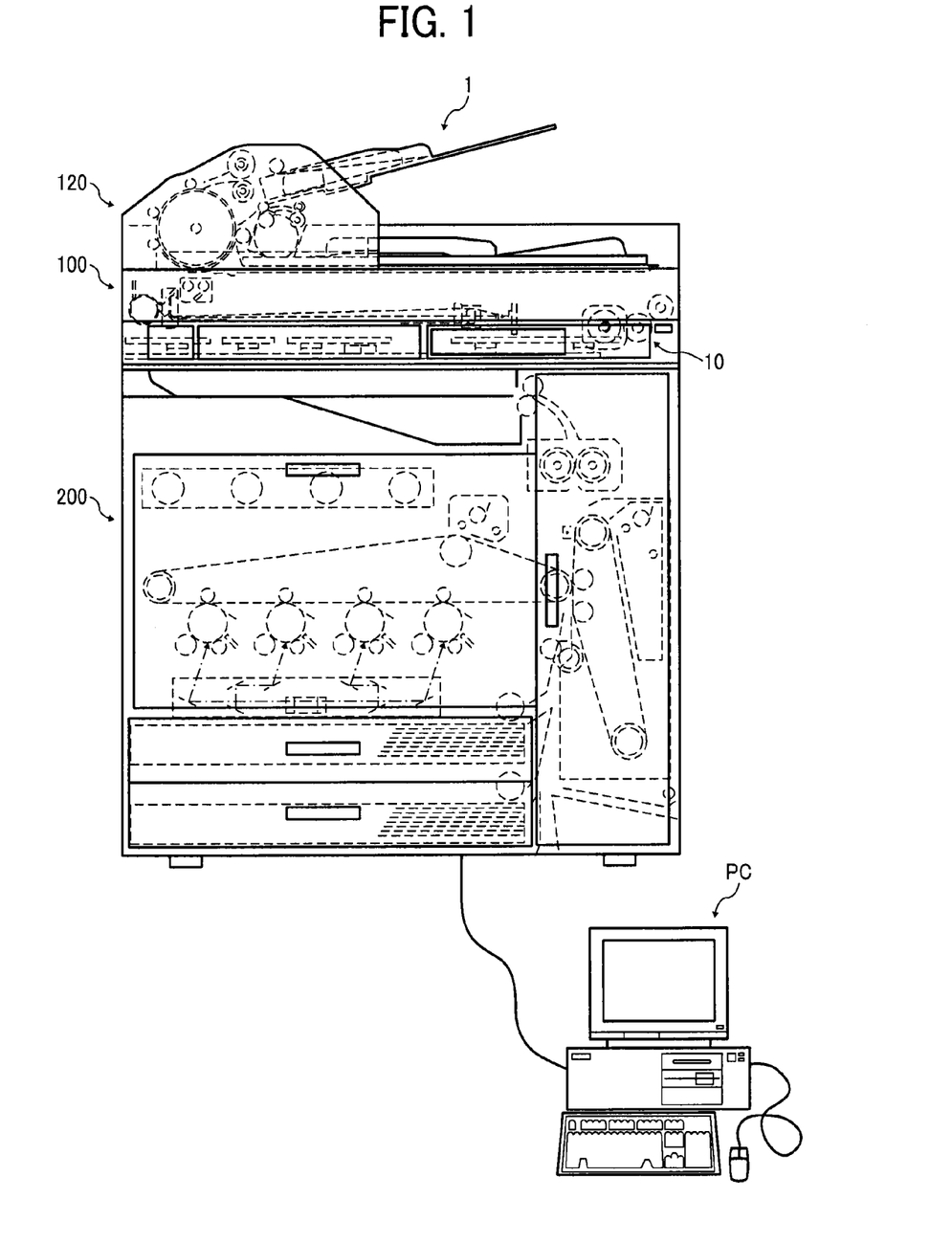
FIG. 1 illustrates a schematic configuration of an image forming apparatus according to an exemplary embodiment of the present invention.

First, explanation will be made of the image forming apparatus with reference to FIG. 1. FIG. 1 illustrates a schematic configuration of an image forming apparatus 1 according to an exemplary embodiment of the present invention.

The image forming apparatus 1 is a full-color copier including an automatic document feeder (ADF) 120, an operation unit 10, a scanner 100, and an image forming device 200. The operation unit 10 and the scanner 100 that includes the ADF 120 can be separated from the image forming device 200. The operation unit 10, the ADF 120, and the scanner 100 include a power equipment driver and a control board having a sensor input and a system control unit. The operation unit 10, the ADF 120, and the scanner 100 communicate directly or indirectly with an engine controller to read a document image at the timing controlled by the engine controller. Further, the image forming apparatus 1, which is coupled to a personal computer, copies a document or prints an image based on image data sent from the personal computer.

Figure 2:
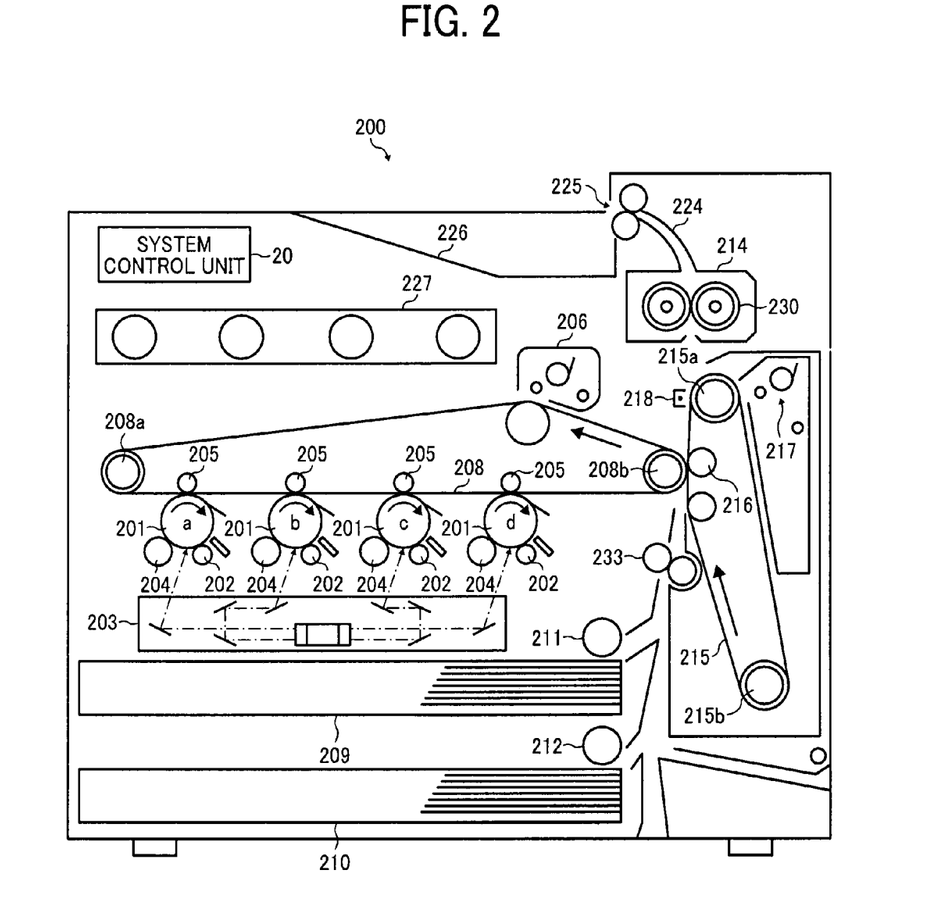
FIG. 2 illustrates an internal configuration of an image forming device of the image forming apparatus of FIG. 1.

FIG. 2 illustrates an internal configuration of the image forming device 200 of the image forming apparatus 1. The image forming device 200 is a full-color image forming device of a four drum system (tandem system). The image forming device 200 includes four image forming units a, b, c, and d, which respectively form an image in magenta (M), cyan (C), yellow (Y), and black (K). The image forming units a, b, c, and d are disposed side by side along a conveyance direction of a first transfer belt 208 (from left to right of FIG. 2).

Next, explanation will be made of the image forming units a, b, c, and d. The image forming units a, b, c, and d employ different single color toners. Except for the colors of toners, the image forming units a, b, c, and d have configurations identical to each other. The image forming units a, b, c, and d each include a photoconductor 201. The photoconductor 201 is rotatably supported and rotates in a direction indicated by arrow. The image forming units a, b, c, and d each include a discharge device, a cleaning device, a charging device 202 and a development device 204 in the outer circumference of the photoconductor 201. The charging device 202 and the developing device 204 are disposed with a space therebetween. Optical information that is output from an exposure device 203 enters the space between the charging device 202 and the developing device 204. The photoconductors 201 and the first transfer belt 208 are partly in contact with each other. Each photoconductor 201 may be a belt shape as well as the drum shape.

The first transfer belt 208 is stretched over a support roller 208a and a drive roller 208b, which are rotatable. The first transfer belt 208 moves in a direction indicated by arrow. Inside the loop of the first transfer belt 208, a plurality of first transfer rollers 205 are disposed facing respective ones of the photoconductors 201 via the first transfer belt 208.

Outside the loop of the first transfer belt 208, a cleaning device 206 for cleaning the first transfer belt 208 is disposed. The cleaning device 206 removes residual toner on the surface of the first transfer belt 208 after the first transfer belt 208 transfers a toner image onto transfer paper (a sheet of paper) or a second transfer belt 215.

The exposure device 203 employs a known system using laser light. Specifically, the exposure device 207 irradiates the surface of the photoconductors 201 that is uniformly charged with the optical information applicable to a full-color image forming. This irradiation forms an electrostatic latent image on the surface of the photoconductors 201. The charging device 203 may be implemented by a light emitting diode (LED) array and an imaging device, which may be used in combination. The second transfer belt 215 is disposed outside the loop of the first transfer belt 208 on the right hand side of FIG. 2. The first transfer belt 208 and the second transfer belt 215 are in contact with each other so as to form a transfer nip therebetween. The second transfer belt 215, which is stretched over a support roller 215a and a drive roller 215b, moves in a direction indicated by arrow. Inside the loop of the second transfer belt 215, a second transfer roller 216 is disposed. Outside the loop of the second transfer belt 215, a cleaning device 217 for cleaning the second transfer belt 215, a charger 218, etc. are disposed. The cleaning device 217 removes residual toner on the surface of the second transfer belt 215 after the second transfer belt 215 transfers a toner image onto the sheet of paper.

Sheet trays 209 and 210 accommodate a bundle of the transfer paper (sheet of paper). Sheet feeding rollers 211 and 212 feed the sheet of paper on the top of the bundle one by one to a pair of registration rollers 233 via a plurality of sheet guides. A fixing device 214, a sheet ejection guide 224, a pair of sheet ejection rollers 225, and a sheet ejection stacker 226 are disposed above the second transfer belt 215. A toner accommodation device 227 is disposed above the first transfer belt 208 and below the sheet ejection stacker 226 to accommodate toner for replenishment. Magenta, cyan, yellow and black toners are accommodated in respective ones of a plurality of cartridges. The toner in each cartridge is supplied to the developing device 204 of the corresponding color by a powder pump, etc.

Hereinafter, explanation will be made of operations performed by each part or device of the image forming device 200 for duplex printing. First, the photoconductor 201 performs image formation. Specifically, light emitted from a laser diode (LD) light source of the exposure device 203 passes through an optical element and reaches the photoconductor 201 of the image forming unit a among the plurality of photoconductors 201 that are uniformly charged by the charging device 202. Thus, the latent image is formed on the photoconductor 201 of the image forming unit a according to writing information corresponding to one of the colors. The developing device 204 develops the latent image formed on the photoconductor 201 into a visible toner image. Thus, the toner image is formed on the surface of the photoconductor 201. The toner image formed on the photoconductor 201 is transferred onto the surface of the first transfer belt 208, which rotates with the photoconductor 201.

Subsequently, the cleaning device removes residual toner on the photoconductor 201. After the cleaning, the discharge device removes the charge on the surface of the photoconductor 201 to prepare for a next image formation cycle. The first transfer 208 carries the toner image transferred thereonto and moves in a direction indicated by arrow in FIG. 2. In a similar manner as described above, a latent image corresponding the other color is formed onto the photoconductor 201 of the image forming unit b. The developing device 204 of the image forming unit b develops the latent image formed on the surface of the photoconductor 201 of the image forming unit b into a visible toner image of the corresponding color. This toner image is overlaid on the toner image of a previous color that is already transferred onto the first transfer belt 208. Thus, the toner images of four different colors are eventually overlaid. Alternatively, the image forming device 200 may form an image of a single color such as a black image.

In concurrent with the above-described operations, the second transfer belt 215 moves in a direction indicated by arrow to cause the second transfer roller 216 to transfer the image formed on the surface of the first transfer belt 208 onto the surface of the second transfer belt 215. In other words, the first transfer belt 208 and the second transfer belt 215 move to proceed the image formation while the images are formed on the respective ones of the plurality of photoconductors 201 of the image forming units a, b, c and d. Such operations shorten the time period required for the image formation. When the surface of the first transfer belt 208 reaches a predetermined position, the photoconductor 201 forms a toner image to be formed on the other surface of paper by similar operations as described above.

A sheet of paper on top of the bundle of the sheets accommodated in the sheet tray 209 or the sheet tray 210 is drawn and conveyed to the registration roller 223. The sheet of paper passes through the registration roller 233 and is conveyed to the transfer nip between the first transfer belt 208 and the second transfer belt 215. The second transfer roller 216 transfers the toner image formed on the surface the first transfer belt 208 onto one side of the sheet of paper at the transfer nip. Subsequently, the sheet of paper is conveyed to the upstream, where the charger 218 transfer the toner image formed on the surface of the second transfer belt 215 on to the other side of the sheet of paper. The sheet of paper is conveyed at appropriate timing so that the image transferred onto the sheet of paper is placed at a correct position.

The sheet of paper having the transferred toner images on the both sides by the operations as described above is conveyed to the fixing device 214. The fixing device 214 melts and fixes the toner images formed on the both sides at one time. The sheet of paper having the image fixed on the both sides passes through the sheet ejection guide 224, and is ejected by the sheet ejection roller 225 to the sheet ejection stacker 226 in the upper part of a frame. When the sheet ejection guide 224, the sheet ejection roller 225, and the sheet ejection stacker 226 are configured as illustrated in FIG. 2, the sheet of paper is stacked in the sheet ejection stacker 226 with the side (page) having an image that is transferred first thereonto facing downward. In other words, the sheet of paper is stacked with the first page onto which the image is transferred directly from the first transfer belt 208 facing downward. In such configuration, the photoconductor 201 first forms an image for the second page and the second transfer belt 215 carries the toner image of the image for the second page. An image for the first image is transferred directly from the first transfer belt 208 onto the sheet of paper. Thus, the sheet of paper is stacked in the sheet ejection stacker 226 in a proper order. A normal image is formed by exposure on the surface of the photoconductor 201, and the normal image is transferred directly from the first transfer belt 208 onto the sheet of paper. A mirror toner image is formed by exposure on the surface of the photoconductor 201, and the mirror toner image is transferred from the second transfer belt 215 onto the sheet of paper.

The system control unit 20 controls the reading and writing of image data from and into a memory so as to perform the image formation in a proper page order and the alternation of the normal or mirror image as described above. The cleaning device 218, which includes a brush roller, a collecting roller and/or a blade, removes residual toner or paper dust on the surface of the second transfer belt 215 after the second transfer belt 215 transfers a toner image onto the paper. Explanation has been made so far of the image formation processing in a duplex transfer mode. The duplex printing is performed by such image formation processing.

Next, explanation will be made of operations performed by the image forming device 200 for simplex printing. A simplex transfer mode using the second transfer belt 215 or a simplex transfer mode using the first transfer belt 208 may be selected for simplex printing. In the simplex transfer mode using the second transfer belt 215, the toner image formed on the first transfer belt 208 in three or four overlapping colors or in a single color of black is transferred onto the second transfer belt 215. The image transferred onto the second transfer belt is transferred onto one side of the sheet of paper. The image is not transferred onto the other side of the sheet of paper. In this case, the sheet of paper is stacked in the sheet ejection stacker 226 with the side having the printed image thereon facing upward. Alternatively, in the simplex transfer mode using the first transfer belt 208, the toner image formed on the first transfer belt 208 in three or four overlapping colors or in a single color of black is transferred onto one side of the sheet of paper, without the transfer of the toner image onto the second transfer belt 215. The image is not transferred onto the other side of the sheet of paper. In this case, the sheet of paper is stacked in the sheet ejection stacker 226 with the side having the printed image thereon facing downward.

Figure 3:
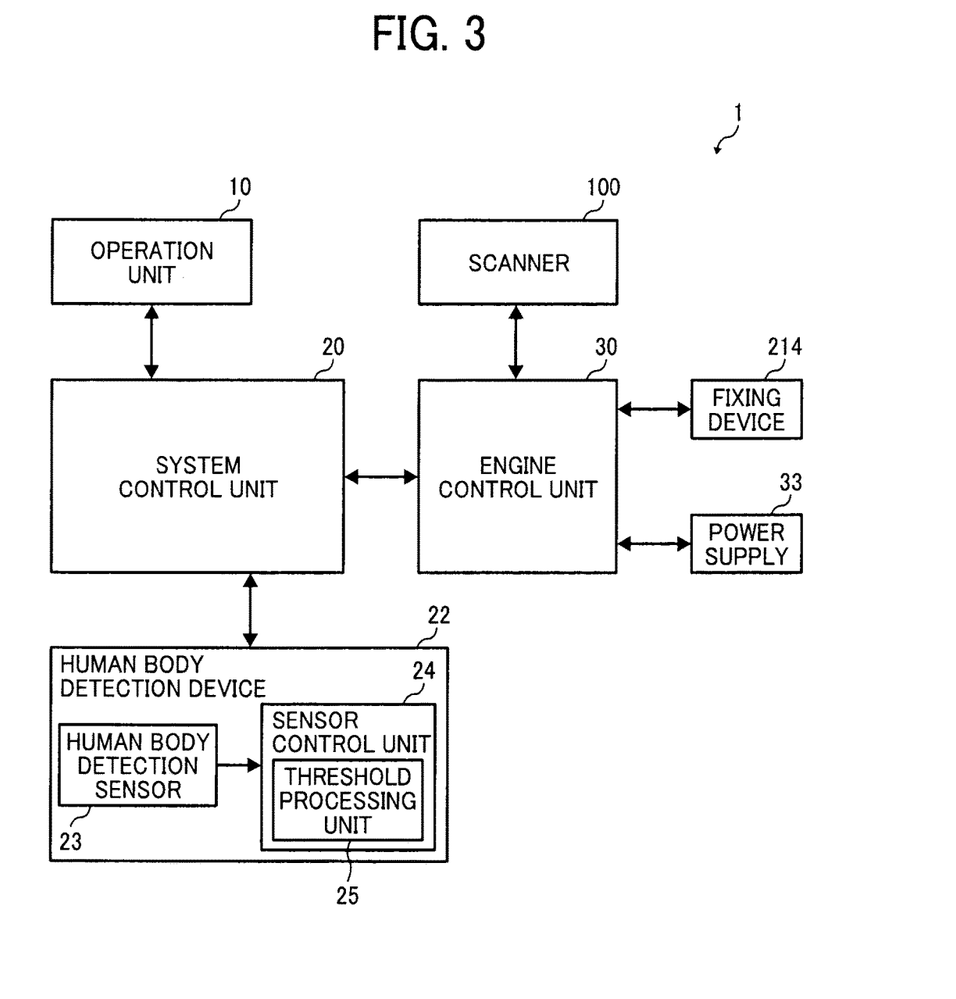
FIG. 3 is a block diagram illustrating a control system of the image forming apparatus of FIG. 1.

Hereinafter, explanation will be made of control of the image forming apparatus 1 and detection of a human body. FIG. 3 is a block diagram illustrating a control system of the image forming apparatus 1. The image forming apparatus 1 includes the operation unit 10, the system control unit 20, an engine control unit 30, a power supply 33, the fixing device 214 and a human body detection device 22.

The operation unit 10 is an interface that allows a user to operate the image forming apparatus 1. The operation unit 10 renders an image of information that is necessary for the user to operate the image forming apparatus on an operation screen. The operation unit 10 further sends an instruction input by the user to the system control unit 20. The system control unit 20 receives, from the engine control unit 30, image data of a document optically read by the scanner 100.

The fixing device 214 fixes unfixed toner on a sheet of paper in accordance with a control instruction from the engine control unit 30. The power supply 33 supplies power to the image forming apparatus 1 in accordance with a control instruction from the engine control unit 30. The power supply 33 converts input voltage from commercial power to voltage necessary for the image forming apparatus 1.

The system control unit 20 and the engine control unit 30 control the entire operation of the image forming apparatus 1. Specifically, the system control unit 20 and the engine control unit 30 sequentially control the scanner 100 and the fixing device 214 according to each operating mode. The image forming apparatus makes a transition among a standby mode, an operating mode, or an energy saving mode. The energy saving mode is a mode in which the power status is lowest. In the energy saving mode, the power supply 33 supplies power to the human body detection device 22 and a part of the system control unit 20 such as network functions.

The human body detection device 22 includes a human body detection sensor 23 to detect a human body, and a sensor control unit 24 to control signal output from the human body detection sensor 23. The human body detection sensor 23 may be implemented by an infrared sensor such as a pyroelectric sensor. The human body detection sensor 23 detects infrared from a front lower portion of the image forming apparatus 1. The human body detection sensor 23 detects infrared from that direction so as to detect infrared from a leg of a human body without being affected by noises from illumination. A detection signal that is output from the human body detection sensor 23 to the sensor control unit 24 is an analog output signal. The sensor control unit 24 is set with a specific voltage as a threshold, and notifies the system control unit 20 of a detection result in accordance with an analog output level from the human body detection sensor 23. A threshold processing unit 25 changes the threshold in accordance with a drift amount of the analog output level from the human body detection sensor 23.

The sensor control unit 24 is configured by a computer including a central processing unit (CPU), a read only memory (ROM), and a random access memory (RAM). The CPU executes programs stored in the ROM to implement various functions of the threshold processing unit 25.

Figure 4:
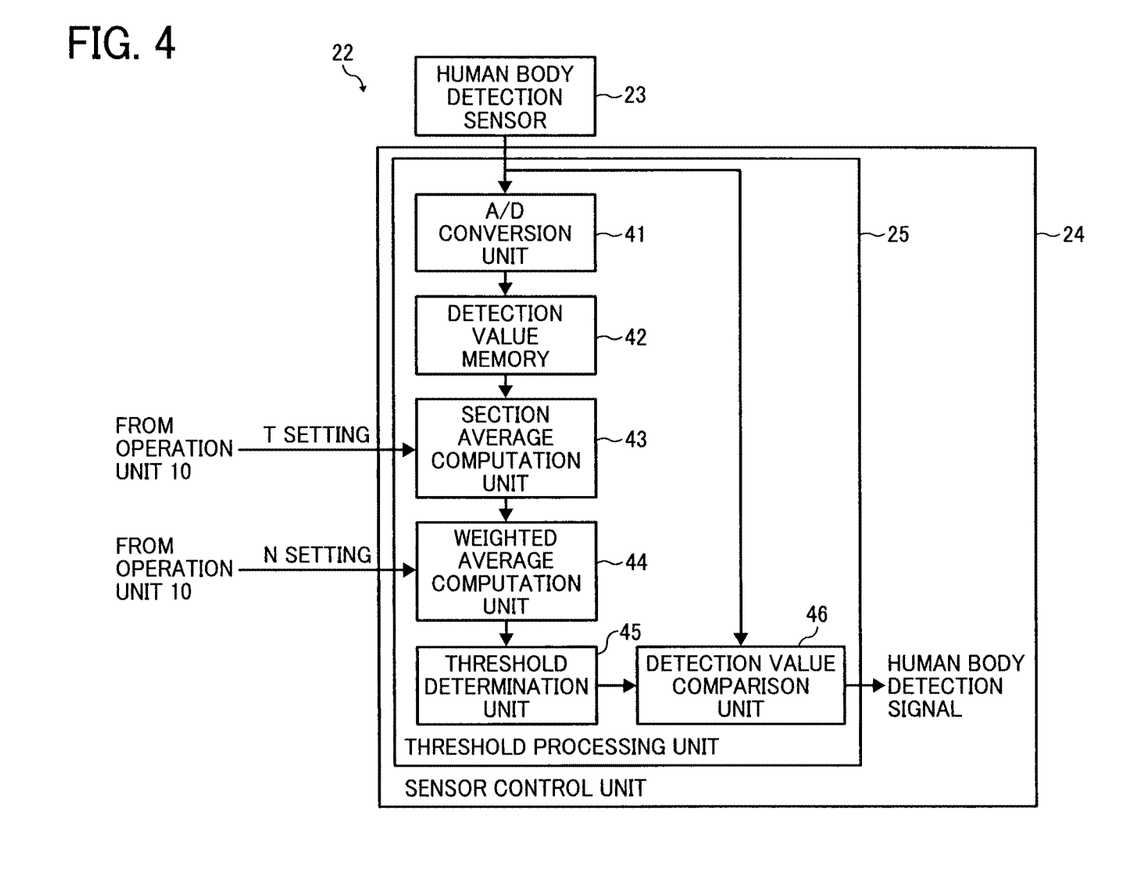
FIG. 4 is a block diagram illustrating a configuration of a human body detection device of the image forming apparatus of FIG. 1.
Figure 5:
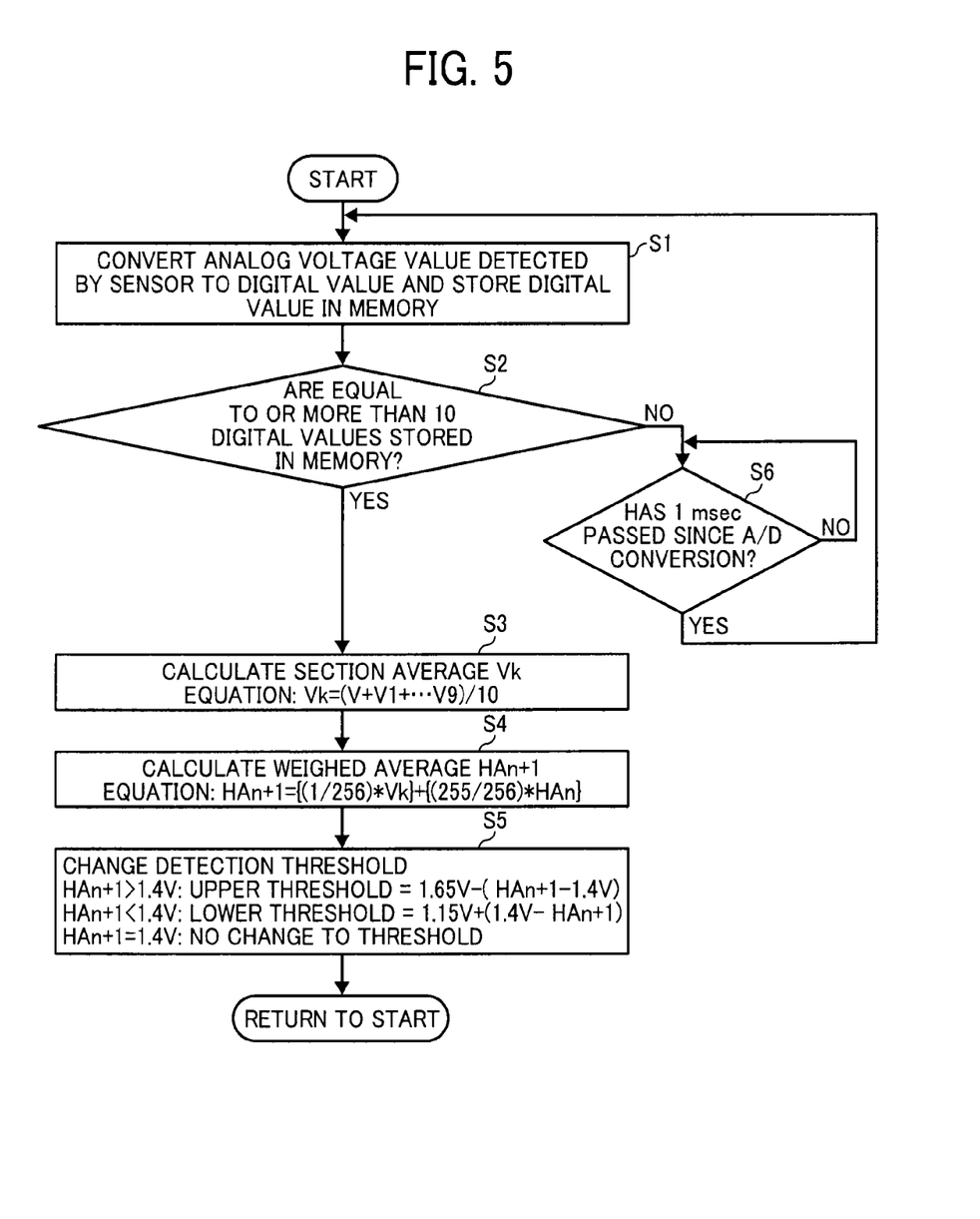
FIG. 5 is a flowchart illustrating operation of the human body detection device of FIG. 4.

Next, explanation will be made of the threshold processing unit 25 with reference to FIGS. 4 and 5. FIG. 4 is a block diagram illustrating a configuration of the human body detection device 22 of the image forming apparatus 1. FIG. 5 is a flowchart illustrating operation of the human body detection device 22.

The sensor control unit 24 includes the threshold processing unit 25. The threshold processing unit 25 includes an A/D conversion unit 41, a detection value memory 42, a section average computation unit 43, a weighted average computation unit 44, a threshold determination unit 45, and a detection value comparison unit 46. The A/D conversion unit 41 converts the analog detection signal received from the human body detection sensor 23 to a digital signal, and outputs the digital signal. The A/D conversion unit 41 executes the signal conversion at predetermined timing, such as every one millisecond. The detection value memory 42 stores the sensor detection value that is converted to the digital signal. The detection value memory 42 stores a predetermined number of the successive detection values such as 10 detection values. In other words, the detection value memory 42 stores a series of the detection values over 10 milliseconds as a unit time T.

A section average value (Vk) is an average value of most recent n numbers of values (V, V1 ... Vn−1) obtained by the following Equation (1).

$$Vk=(V+V1+V2+ ... Vn-1)/n \quad (1)$$

The section average computation unit 43 computes the section average value based on the 10 detection values stored in the detection value memory 42. Specifically, the section average computation unit 43 assigns 10 to n of the above Equation (1) to compute the section average value Vk by the following Equation (2).

$$Vk=(V+V1+ ... V9)/10 \quad (2)$$

The section average computation unit 43 outputs the computed section average value to the weighted average computation unit 44.

In this exemplary embodiment, the number of the detection values computed by the section average computation unit 43 is set to a number that even the detection value memory 42 having a small capacity can deal with. Accordingly, there is no need for the detection value memory 42 to have a large capacity that may cause cost increase. The number of the detection values computed by the section average computation unit 43 may be changed in accordance with an instruction input from the operation unit 10.

The weighted average computation unit 44 performs weighted averaging processing on the section average value that is output from the section average computation unit 43. A weighted average value HAn+1 is obtained by the following Equation (3).

$$HAn+1=\{(1/N)*V\}+[\{(N-1)/N\}*HAn] \quad (3)$$

In the Equation (3), V is a current voltage, and N is a denominator for the weighted averaging.

The weighted average computation unit 44 computes the weighted average value based on the section average value received from the section average computation unit 43.

Specifically, the weighted average computation unit 44 assigns 256, which is 2 to the eighth power, to N of the above Equation (3) to compute the weighted average value HAn+1 by the following Equation (4).

$$HAn+1=\{(1/256)*Vk\}+\{(255/256)*HAn\} \quad (4)$$

In the Equation (4), each of n and n+1 denotes the number of terms of HA or the order of HA. Both of n and n+1 are natural numbers.

The drift amount of the human body detection sensor 23 is obtained based on the computed weighted average value.

A step frequency of human walking is 1.4 Hz. Accordingly, a frequency of the voltage of the human body sensed by a pyroelectric sensor is also 1.4 Hz. In view of such property of the pyroelectric sensor as the human body detection senor 23 and the detection of the leg, it is preferable that the unit time (T) in the section average computation is from 5 through 20 milliseconds, and the denominator (N) of the weighted average computation is the powers of 2 such as 8, 16, 32, 128, and 256.

In this exemplary embodiment, the section average computation unit 43 computes the section average value of a series of the detection values per unit time T of 10 milliseconds. Further, in this exemplary embodiment, the weighted average computation unit 44 computes the weighted average value with the denominator N of 256, which is 2 to the eighth power. With such configuration, the human body detection device 22 can detect the leg of the human body in an improved manner. The denominator N may be changed to the other powers of 2 than 256 in accordance with an instruction input from the operation unit 10.

The values of T and N in the above equations are determined so that the value of T*N is within a range that enables the human body detection device 22 to detect the human body detection in view of the human walking cycle. In this exemplary embodiment, the unit time T in the computation by the section average computation unit 43 is set to 10 milliseconds, and a coefficient N used as the denominator of the division in the computation by the weighted average computation unit 44 is set to 256, which is the powers of 2. Accordingly, in this exemplary embodiment, T*N is 2.56 seconds.

Alternatively, for instance, T and N may be set to 20 milliseconds and 128 respectively, in accordance with an input from the operation unit 10. T and N may be another combination of numbers that enables the human body detection device 22 to detect the human body in view of the human walking cycle.

The threshold determination unit 45 changes an upper threshold, which defaults to 1.65V in this exemplary embodiment, or a lower threshold, which defaults to 1.15V in this exemplary embodiment, based on the following conditions:

when HAn+1<1.4V, the upper threshold=1.65V−(1.4V−HAn+1);

when HAn+1>1.4V, the lower threshold=1.15V+(HAn+1−1.4V); and when HAn+1=1.4V, no change to the thresholds.

With such configuration, the threshold for the human body detection is changed to an appropriate value in accordance with a drift amount of the human body detection sensor 23.

Next, explanation will be made of the operation of the sensor control unit 24. FIG. 5 is a flowchart illustrating operation of the human body detection device 22. The A/D conversion unit 41 converts the detection value detected by the human body detection sensor 23 to the digital value, and outputs the digital value to the detection value memory 42 to cause the detection value memory 42 to store the digital value (S1). The storage operation by the detection value memory 42 is executed every one millisecond (S6). When 10 digital values are stored in the detection value memory 42 (S2: YES), the section average computation unit 43 acquires the 10 digital values from the detection value memory 42 to compute the section average value Vk of 10 detection values acquired every 1 millisecond by the above Equation (2) (S3).

Next, the weighted average computation unit 44 acquires the section average value Vk from the section average computation unit 43 to compute and output the weighted average value HAn+1 by the above Equation (4) (S4). The threshold determination unit 45 changes the threshold based on the weighted average value HAn+1 received from the weighted average computation unit 44 in accordance with the above described condition (S5). Thus, a series of operations ends. This operation of FIG. 5 is repeated.

The detection value comparison unit 46 compares the changed threshold with an output value from the human body detection sensor 23. When the comparison result indicates that the output value from the human body detection sensor 23 exceeds the threshold, the human body detection device detects presence of the human body. The human body detection device 22 notifies the system control unit 20 of the human body detection result. In response to the notification, the system control unit 20 causes the image forming apparatus 1 to transition from the energy saving mode.

Figure 6:
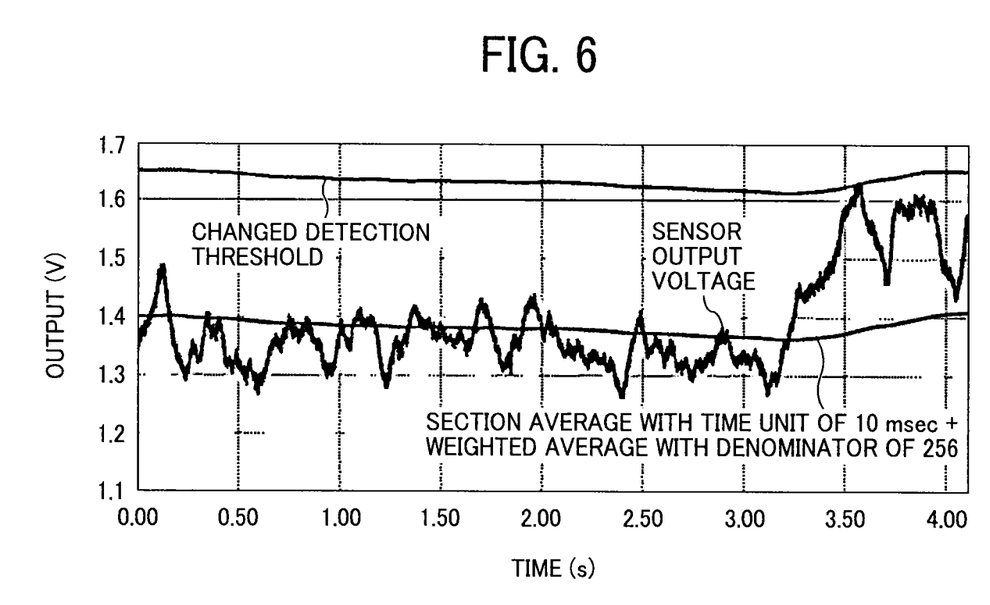
FIG. 6 is a graph illustrating a detection state of a drift amount by the human body detection device of FIG. 4.

FIG. 6 is a graph illustrating a detection state of a drift amount by the human body detection device 22. The graph illustrates a case where a sensing timing of the human body detection sensor 23 is 1 millisecond, the unit time T of the section average computation by the section average computation unit 23 is 10 milliseconds, and the denominator N of the weighted average computation by the weighted average computation unit 44 is 256. From the graph, it can be recognized that the threshold is changed in accordance with the drift of the human body detection sensor 23 and the human body is detected based on the changed threshold.

As described above, according to this exemplary embodiment, in the image forming apparatus 1, the threshold processing unit 25 averages the output values from the human body detection sensor 23, and subsequently performs the weighted average processing to set the threshold. With such configuration and processing, an inexpensive memory having a small capacity or a computation element such as a CPU that is not high in performance may be used for the human body detection device 22. Accordingly, the human body detection device 22 can acquire the drift amount of the human detection sensor 23 with a light processing load and accurately detect the human body. Further, according to this exemplary embodiment, the image forming apparatus 1 having the human body detection device 22 can accurately detect the human body by the human body detection device 22 to transition from the energy saving mode.

According to an aspect of the present invention, the human body detection device 22 for detecting whether a human body is present within a predetermined distance from the imaging forming apparatus equipped with the human body detection device includes the human body detection sensor 23, the threshold processing unit 25, and the sensor control unit 24. The human body detection sensor 23 senses the infrared to sequentially output a plurality of detection values. The threshold processing unit 25 performs averaging and weighted averaging on the detection values to obtain a weighted average value of the detection values, and sets a threshold based on the weighted average value of the detection values. The sensor control unit 24 determines that the human body is present within the predetermined distance from the image forming apparatus 1 when a detection value output from the human body detection sensor 23 exceeds the set threshold.

According to this aspect, the threshold processing unit 25 performs averaging on the output values from the human detection sensor 23 and then further performs weighted averaging to set the threshold. With such configuration and processing, an inexpensive memory having a small capacity or a computation element such as a CPU that is not high in performance may be used for the human body detection device 22. Accordingly, the human body detection device 22 can acquire the drift amount of the human detection sensor 23 with a light processing load and accurately detect the human body.

According to another aspect of the present invention, in the human body detection device 22, the threshold processing unit 25 may sequentially perform the averaging of a series of the detection values per predetermined unit time to obtain a section average value and sequentially perform the weighted averaging on the obtained section average value to obtain the weighted average value.

According to this aspect, an average of a series of the output values from the human detection sensor 23 is obtained per predetermined unit time, and the obtained averages are sequentially output. With such configuration and processing, an inexpensive memory having a small capacity may be used for the human body detection device 22. Accordingly, the human body detection device 22 can acquire the drift amount of the human detection sensor 23 with a light processing load and accurately detect the human body.

According to still another aspect of the present invention, in the human body detection device 22, the unit time in the averaging may be changed in accordance with an instruction input from the outside.

According to this aspect, the unit time in the averaging by the section average computation unit 43 may be changed. With such configuration and processing, a memory having a minimum capacity may be used for the human body detection device 22.

According to still another aspect, in the human body detection device 22, a coefficient of the weighted averaging may be changed in accordance with an instruction input from the outside.

According to this aspect, the coefficient of the computation by the weighted average computation unit 44 may be changed in accordance with an externally-input instruction. With such configuration and processing, the coefficient may be set the powers of 2. Accordingly, a computation element may perform the weighted average processing even if it is not high in performance.

According to still another aspect of the present invention, in the human detection device 22, the threshold processing unit 25 may set the predetermined unit time to T milliseconds, set a value of the coefficient as a denominator N of division in the weighed averaging to the powers of 2, and set a value of T*N to be within a range that enables the human body detection device to detect the human body in view of a human walking cycle.

According to this aspect, the values of T and N are set to the appropriate values as well as the values that do not require a large memory or a high computation performance.

With such configuration and processing, an inexpensive memory having a small capacity or a computation element such as a CPU that is not high in performance may be used for the human body detection device 22. Accordingly, the human body detection device 22 can acquire the drift amount of the human detection sensor 23 with a light processing load to accurately detect the human body.

According to still another aspect of the present invention, in the human body detection device 22, the human body detection sensor 23 may be disposed at a lower portion of the image forming apparatus 1 such that the sensor senses the infrared from a leg of the human body adjacent to the image forming apparatus 1.

With such configuration and operation, the human body detection device 22 can accurately detect the human body owing to the suppressed noises from illumination or the like.

The image forming apparatus 1 according to an aspect of the present invention includes the human body detection device 22. The imaging forming apparatus can accurately detect the human body by the human body detection device incorporated therein and transition from the energy saving mode.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A human body detection device for detecting whether a human body is present within a predetermined distance from an apparatus equipped with the human body detection device, the device comprising:
   a sensor configured to sense infrared to sequentially output a plurality of detection values; and
   circuitry configured to
      perform, sequentially for each set of a predetermined number of detection values output by the sensor, averaging on the set of the detection values and obtain a weighted average value by calculating a weighted average of the average of the detection values and a weighted average value calculated for a previous set of detection values, and set a threshold based on the obtained weighted average value; and
      determine that the human body is present within the predetermined distance from the apparatus when a detection value output from the sensor exceeds the set threshold.

2. The human body detection device according to claim 1, wherein the circuitry sequentially performs the averaging of the set of the detection values per predetermined unit time to obtain a section average value and sequentially performs the weighted averaging on the obtained section average value to obtain the weighted average value.

3. The human body detection device according to claim 2, wherein the unit time is changed in accordance with an instruction input from the outside.

4. The human body detection device according to claim 1, wherein a coefficient of the weighted averaging is changed in accordance with an instruction input from the outside.

5. The human body detection device according to claim 1, wherein the circuitry sets a unit time in the averaging to T milliseconds, sets a value of a coefficient as a denominator N of division in the weighed averaging to powers of 2, and sets a value of T*N to be within a range that enables the human body detection device to detect the human body in view of a human walking cycle.

6. The human body detection device according to claim 1, wherein the sensor is disposed at a lower portion of the apparatus such that the sensor senses the infrared from a leg of the human body adjacent to the apparatus.

7. An image forming apparatus comprising the human body detection device of claim 1.

8. The human body detection device according to claim 1, wherein the circuitry is configured to change the threshold based on the obtained weighted average value in response to a determination that the obtained weighted average value is below a predetermined value.

9. The human body detection device according to claim 1, wherein the circuitry is further configured to decrease an upper threshold based on the obtained weighted average value, in response to a determination that the obtained weighted average value is below a predetermined value.

10. The human body detection device according to claim 1, wherein the circuitry is further configured to increase a lower threshold based on the obtained weighted average value, in response to a determination that the obtained weighted average value is greater than a predetermined value.

11. A human body detection method for detecting whether a human body is present within a predetermined distance from an apparatus equipped with a human body detection device, the method comprising:
   sensing infrared to sequentially output a plurality of detection values;
   performing, sequentially for each set of a predetermined number of detection values output by the sensing, averaging on the set of the detection values and obtaining a weighted average value by calculating a weighted average of the average of the detection values and a weighted average value calculated for a previous set of detection values;
   setting a threshold based on the obtained weighted average value; and
   determining, by a processor of the human body detection device, that the human body is present within the predetermined distance from the apparatus when a detection value output from the sensing exceeds the set threshold.

12. The human body detection method according to claim 11, further comprising:
   sequentially performing the averaging on the set of the detection values per predetermined unit time to obtain a section average value; and
   sequentially performing the weighted averaging on the obtained section average value to obtain the weighted average value.

13. The human body detection method according to claim 12, further comprising:
   changing the unit time in accordance with an instruction input from the outside.

14. The human body detection method according to claim 11, further comprising:
   changing a coefficient of the weighted averaging in accordance with an instruction input from the outside.

15. The human body detection method according to claim 11, further comprising:
   setting a unit time in the averaging to T milliseconds;
   setting a value of a coefficient as a denominator N of division in the weighed averaging to powers of 2; and
   setting a value of T*N to be within a range that enables the human body detection device to detect the human body in view of a human walking cycle.

16. The human body detection method according to claim 11, further comprising:
   sensing the infrared from a leg of the human body adjacent to the apparatus by a sensor disposed at a lower portion of the apparatus.

17. The human body detection device according to claim 1, wherein the circuitry is further configured to change the threshold based on the obtained weighted average value, in response to a determination that the obtained weighted average value is greater than a predetermined value.

18. The human body detection method according to claim 11, further comprising, in response to a determination that the obtained weighted average value is greater than a predetermined value, changing the threshold based on the obtained weighted average value.

19. The human body detection method according to claim 11, further comprising changing the threshold based on the obtained weighted average value in response to a determination that the obtained weighted average value is below a predetermined value.

* * * * *